Nov. 28, 1967  B. A. STAUFFER  3,355,203
INSULATION RETAINER
Filed Oct. 25, 1965

INVENTOR
BARTON A. STAUFFER
BY Rupert J. Brady
ATTORNEY

United States Patent Office 3,355,203
Patented Nov. 28, 1967

3,355,203
INSULATION RETAINER
Barton A. Stauffer, 1113 Crest Lane,
Lancaster, Pa. 17601
Filed Oct. 25, 1965, Ser. No. 505,159
5 Claims. (Cl. 287—189.35)

ABSTRACT OF THE DISCLOSURE

A resilient metal retainer for supporting and maintaining insulation batts in position between structural frame members, such as studs, joists and rafters, which has a pair of relatively sharp penetrating tips at each end and wherein the axial length of the retainer is shortened for inserting between a pair of frame members by applying axial compressive force to the retainer which then returns toward its original position when the compressive force is released to embed the pairs of tips in the pair of frame members to hold the insulation batt in place.

---

Heretofore various types of retainers have been employed for supporting and maintaining insulation batts in position between the frame members of a structure. For instance, a paper strip having flaps on the edges thereof has been used wherein the paper strip supports the insulation batt and the flaps are secured to the frame members by nails, staples, and the like. Paper type retainers have not proven to be entirely satisfactory due to the added expense in material and labor in the use of nails, staples, etc., and the time consumed during the installations of the insulation. Furthermore, paper retainers have a tendency to sag after long use, due to the fact that the paper dries out as it ages; thus, with the sagging of the retainer the insulation batt is no longer properly supported in order to give the maximum insulation effect.

It has also been proposed to use various types of flexible resilient fasteners designed to produce a biasing force against the insulation batt to maintain the batt between the frame members. However, it has been found that these retainers compress the batt to such a degree that the batt thickness is reduced with the concomitant loss of an effective insulation barrier.

After considerable research and experimentation, the insulation retainer of the present invention has been developed to overcome the above noted disadvantages in known types of retainers. The insulation retainer of the present invention comprises, essentially, a resilient wire having a pair of relatively movable legs disposed in crossover relation to form an X member, the end of the legs on one side of the crossover are provided with chisel-shaped points and are connected by a transversely extending member, preferably of arcuate shape bent inwardly toward the crossover. The legs on the opposite side of the crossover are bent slightly inwardly towards each other and are also provided with chisel-shaped ends.

In an unflexed position, the retainer is designed to have a linear dimension slightly greater than the distance between adjacent frame members, so that when mounting an insulation batt between the frame members, the retainer is first compressed by moving the transversely extending member and cross-over towards each other to thereby decrease the linear dimension of the retainer. The compressed retainer is then placed against the face of the insulation batt in such a manner that the legs and transverse member are in a plane parallel to the batt face, whereby when the retainer is released the legs expand in the plane parallel to the batt to thereby embed the pointed ends into the frame members.

By the construction and arrangement of the improved retainer, insulation batts or blankets can be quickly and economically installed, and by reason of the fact that the resilient movement of the retainer is in a plane parallel to the face of the batt or blanket, rather than in a plane normal thereto, the thickness of the insulation is not decreased which would reduce the effectiveness of the insulation barrier, and the resilience of the legs and transverse member provides a continuous biasing force urging the chisel-shaped ends into the frame members whereby the insulation batt is maintained in proper position even after long and continued use.

An object of the invention is to provide an improved resilient retainer for supporting and maintaining insulation batts or blankets between structural frame members, such as studs, joists and rafters.

Another object of the invention is to provide an improved resilient retainer for supporting insulation batts or blankets between structural frame members wherein the retainer is adapted to be placed in a plane parallel to the face of the batt, and is constructed and arranged to have a resilience urging the retainer in a direction parallel to the batt face to thereby embed the ends of the retainer into the frame members.

Still another object of the invention is to provide an improved resilient retainer for supporting insulation batts or blankets between structural frame members wherein the retainer includes a resilient wire formed to have a pair of legs disposed in crossover relation to form an X member, and a transversely extending member interconnected to the ends of the legs on one side of the crossover, the retainer having a resilience urging the legs in a direction parallel to the batt face to thereby embed the ends of the legs into the frame members.

A further object of the invention is to provide an improved insulation retainer characterized by simplicity of construction, inexpensiveness in fabrication, and constructed and arranged to facilitate the quick and economical installation of insulation batts or blankets.

With these and other objects in view, which may be incident to my improvements, the invention consists in the parts and combinations to be hereinafter set forth and claimed, with the understanding that the several necessary elements comprising my invention, may be varied in construction, proportions, and arrangements, without departing from the spirit and scope of the appended claims.

In order to make my invention more clearly understood I have shown in the accompanying drawings means for carrying the same into practical effect, without limiting the improvements in their useful application to the particular constructions which, for the purpose of explanation, have been made the subject of illustration.

Figure 1:
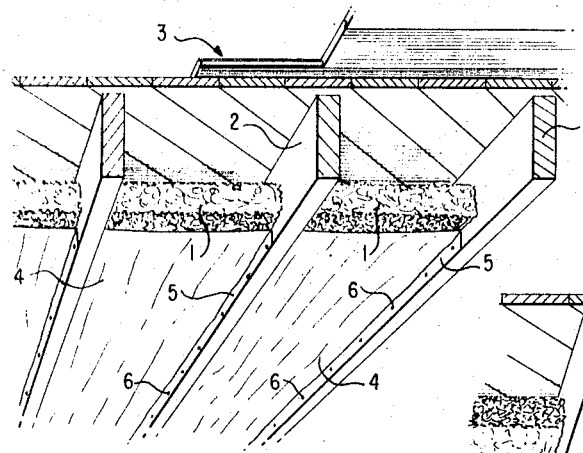
FIGURE 1 is a perspective view showing a prior art manner of mounting an insulation batt between joists.

Referring to the drawings, and more particularly to FIG. 1, insulation batts or blankets 1 of fibrous material, such as wool, are shown mounted between joists 2 which support a floor 3 in a conventional manner. The insulation batts illustrated are of a known type wherein a paper cover 4, somewhat wider than the batt, is secured thereto by means of a suitable cement, the flaps 5 on each side of the batt being fastened to the joists by means of nails or staples 6. As pointed out hereinbefore, these paper-type retainers are not entirely satisfactory due to the added expense in material in the use of nails, staples, etc., and the time consumed installing the insulation; furthermore, as the paper cover dries out it has a tendency to sag and tear, thus no longer properly supporting the insulation batt to give the maximum insulation effect.

Figure 3:
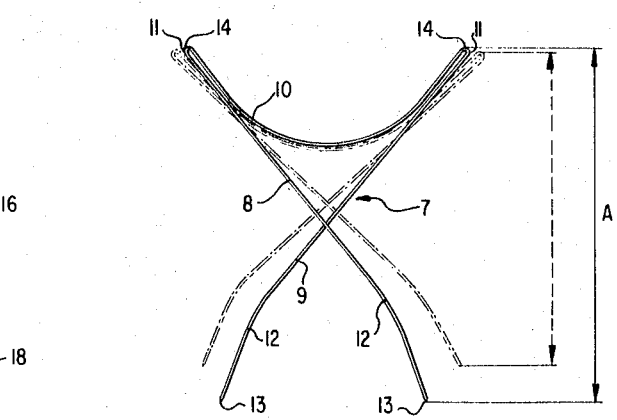
FIG. 3 is a detail view of the retainer of the present invention.
Figures 4, 5:
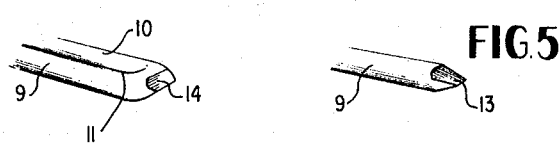
FIGS. 4 and 5 are fragmentary views showing the chisel-shaped ends of the retainer.

To overcome these noted disadvantages, the retainer 7 (FIG. 3) of the present invention has been devised wherein a resilient wire is formed with a pair of legs 8 and 9 disposed in crossover relation to form an X member. The ends of the legs on one side of the crossover are integrally connected by a transversely extending arcuate member 10 having its outer ends bent back upon themselves, as at 11, to form the legs 8 and 9. The legs on the opposite side of the crossover are bent slightly inwardly toward each other, as at 12 and are provided with chisel-shaped ends 13, the reversely bent portion 11 also being provided with chisel-shaped points 14, whereby the ends of the legs become embedded in adjacent frame members during the installation of insulation, to be described more fully hereinafter.

Figure 2:
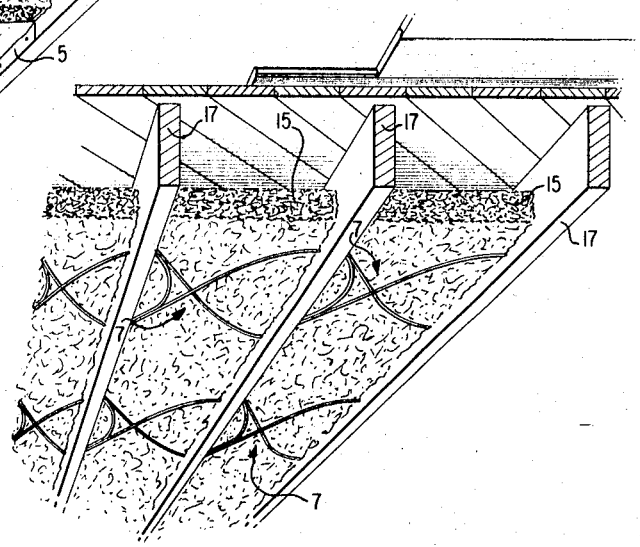
FIG. 2 is a perspective view showing insulation batts mounted between joists by means of the retainers of the present invention.
Figure 6:
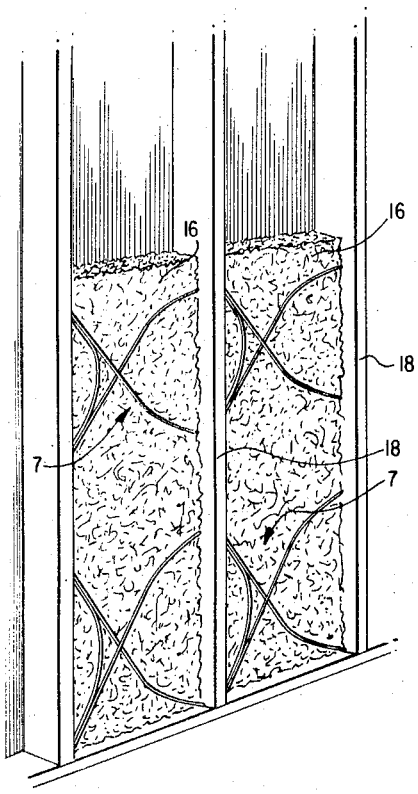
FIG. 6 is a perspective view showing insulation batts being held between studs by means of the improved retainer of the present invention.

As will be seen in FIGS. 2 and 6, the improved retainer is shown holding insulation batts 15 and 16 between structural frame members, such as joists 17 and studs 18, respectively. The retainer is designed to have a linear dimension A (FIG. 3) slightly greater than the distance between adjacent frame members so that when installing insulation batts between the frame members, the user, while holding the batt in place with one hand, places the thumb of the other hand on the arcuate member 10 and his finger in the crossover and compresses the retainer by moving the arcuate member and crossover towards each other to thereby decrease the linear dimension of the retainer, as shown in dotted lines in FIG. 3. The compressed retainer is then placed against the batt so that when released, the resilience of the retainer causes the legs to move in a plane parallel to the face of the batt to thereby embed the chisel-shaped ends 13 and 14 into the frame members.

As noted hereinabove, known types of resilient retainers have been designed to have a biasing force in a direction toward the batt or blanket; however, this has a tendency to compress the batt, to thereby reduce its thickness with the result that the effectiveness of the insulation is greatly reduced. This disadvantage is overcome by the retainer of the present invention which is constructed and arranged to produce a resilient movement of the legs 8 and 9 in a plane parallel to the face of the insulation batt or blanket, rather than in a plane normal to the batt as found in insulation retainers hitherto employed.

Furthermore the continuous biasing force urging the chisel-shaped ends 13 and 14 into the frame members holds the retainer and associated insulation batt in place, under all conditions, such as drying and warping of the wooden frame members.

While the use of the retainers of the present invention is shown employed with batts or blankets having no paper cover, it will be understood by those skilled in the art that the retainer can be also used with paper covered batts of the type shown in FIG. 1. Furthermore, the number and spacing of the retainers can be varied to hold insulation of various weights, or if desired, the retainers may be installed in multiple layers to support heavier insulation materials.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims. By way of example, one such variation contemplated within the scope of the invention is to connect separate pointed members on the ends of legs 8 and 9, and to the reversely bent portions 11 in lieu of forming the chisel-shaped ends 13 and points 14 directly on the resilient wire member forming the retainer.

What I claim as new and desire to secure by Letters Patent of the United States, is as follows:

1. A retainer of the character described, for supporting insulation batts between spaced frame members, comprising a pair of relatively movable elongated resilient leg members disposed in crossed relation to each other and defining a movable crossover point, each leg member having relatively sharp penetrating end portions on opposite ends thereof adapted to be embedded into the frame members, and arcuate resilient means in the plane of the leg members interconnecting said leg members adjacent a pair of ends thereof on one side of said crossover point, said arcuate resilient means disposed entirely between said pair of ends and said crossover point, whereby axial compression of the resilient means and crossover point shortens the axial length of the retainer and moves the corresponding penetrating end portions away from each other on each end of the retainer, and whereby the resilience of the retainer produces a biasing force urging the legs in the direction of their original position to thereby embed the penetrating end portions into the frame members when the compression force is released.

2. An insulation retainer according to claim 1 wherein the penetrating end portions of the legs are provided with chisel-shaped points to facilitate the embedding of the retainer at opposite ends into the frame members.

3. An insulation retainer according to claim 1, wherein the arcuate resilient means interconnecting the leg members is disposed to curve inwardly toward said crossover point.

4. An insulation retainer according to claim 1, wherein the arcuate resilient means is generally transversely extending and has end portions bent back upon themselves to form said elongated resilient leg members.

5. A retainer of the character described, for supporting insulation batts between spaced frame members, comprising a resilient one-piece wire element including a pair of relatively movable resilient leg members disposed in crossover relation to form a generally X-shaped member, said leg members having free end portions formed with chisel-shaped points defining a first pair of penetrating tips adapted to be embedded into the frame members, and a transversely extending, resilient arcuate member extending in the direction of the crossover and interconnecting the leg members on one side of the crossover, the arcuate member being connected to the leg members by portions of the wire being bent back upon themselves with the bends having chisel-shaped points at the extremities thereof to define a second pair of penetrating tips, wherein axial compression of the retainer for insertion between the frame members results in movement of the respective tips of each pair of penetrating tips away from one another, whereby the resilience of the retainer produces a biasing force urging the legs in the direction of their original position to thereby embed the end portions into the frame members.

References Cited

UNITED STATES PATENTS 2,926,407   3/1960   Cassell _____ 24—161

CARL W. TOMLIN, *Primary Examiner.*

R. S. BRITT, *Assistant Examiner.*